US009838515B2

(12) United States Patent
Fujii

(10) Patent No.: US 9,838,515 B2
(45) Date of Patent: Dec. 5, 2017

(54) COMMUNICATION APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 13/861,035

(22) Filed: Apr. 11, 2013

(65) Prior Publication Data

US 2013/0311666 A1 Nov. 21, 2013

(30) Foreign Application Priority Data

May 17, 2012 (JP) .................................. 2012-113757

(51) Int. Cl.
G06F 15/16 (2006.01)
H04L 29/06 (2006.01)

(52) U.S. Cl.
CPC .............. *H04L 69/24* (2013.01); *H04L 69/18* (2013.01)

(58) Field of Classification Search
CPC ....... H04L 63/08; H04L 63/1433; G06F 8/10; G06F 8/30; G06Q 10/067; G06Q 30/04; G06Q 30/06; G06Q 40/02; G06Q 40/12
See application file for complete search history.

(56) References Cited

U.S. PATENT DOCUMENTS

| 6,085,110 | A | * | 7/2000 | Nilsson ...................... 455/552.1 |
| 6,157,465 | A | | 12/2000 | Suda et al. ................... 358/407 |
| 6,477,570 | B1 | | 11/2002 | Takayama et al. ........... 709/224 |
| 7,142,536 | B1 | * | 11/2006 | Gossett et al. ............... 370/360 |
| 7,586,860 | B2 | | 9/2009 | Shitano et al. ............... 370/282 |
| 7,631,181 | B2 | | 12/2009 | Hirata et al. .................. 713/151 |
| 7,720,477 | B2 | | 5/2010 | Moritomo et al. ........ 455/435.1 |
| 7,809,845 | B2 | | 10/2010 | Fujii et al. .................... 709/230 |
| 7,882,196 | B2 | | 2/2011 | Fujii et al. .................... 709/208 |
| 7,882,234 | B2 | | 2/2011 | Watanabe et al. ............ 709/227 |
| 7,984,196 | B2 | | 7/2011 | Hirose et al. ................. 709/253 |

(Continued)

FOREIGN PATENT DOCUMENTS

| JP | 11-055350 | 2/1999 | |
| JP | 2006-185421 | 7/2006 | ............. B41J 29/00 |

(Continued)

OTHER PUBLICATIONS

JP Office Action—JP Application No. 2012113757 dated Mar. 18, 2016.

*Primary Examiner* — Umar Cheema
*Assistant Examiner* — Anh Nguyen
(74) *Attorney, Agent, or Firm* — Fitzpatrick, Cella, Harper, & Scinto

(57) ABSTRACT

A communication apparatus, which is connectable with a plurality of networks including a first network and a second network of a type different from the first network, is provided. The communication apparatus detects an operation by user for setting communication parameters for connecting to a network, and provides, if detecting the operation while connecting with another first communication apparatus via the first network, another second communication apparatus with communication parameters for communication via the second network.

9 Claims, 7 Drawing Sheets

(56) References Cited

U.S. PATENT DOCUMENTS

| | | | |
|---|---|---|---|
| 8,050,709 B2 * | 11/2011 | Hall .................... | H04W 12/08 |
| | | | 101/2 |
| 8,131,859 B2 | 3/2012 | Fujii et al. .................... | 709/228 |
| 8,250,218 B2 | 8/2012 | Watanabe et al. ............ | 709/227 |
| 8,503,933 B2 | 8/2013 | Moritomo et al. .......... | 455/41.2 |
| 2006/0268744 A1 | 11/2006 | Sakai et al. .................... | 370/254 |
| 2010/0020706 A1 | 1/2010 | Fujii ............................ | 370/252 |
| 2010/0293300 A1 * | 11/2010 | Tachibana .................... | 709/249 |
| 2012/0270587 A1 | 10/2012 | Watanabe et al. ............ | 455/509 |
| 2013/0138793 A1 * | 5/2013 | Nishioka ....................... | 709/223 |

FOREIGN PATENT DOCUMENTS

| | | | |
|---|---|---|---|
| JP | 2010-268299 | 11/2010 | |
| JP | 2011-015285 | 1/2011 | ............ H04W 36/14 |

\* cited by examiner

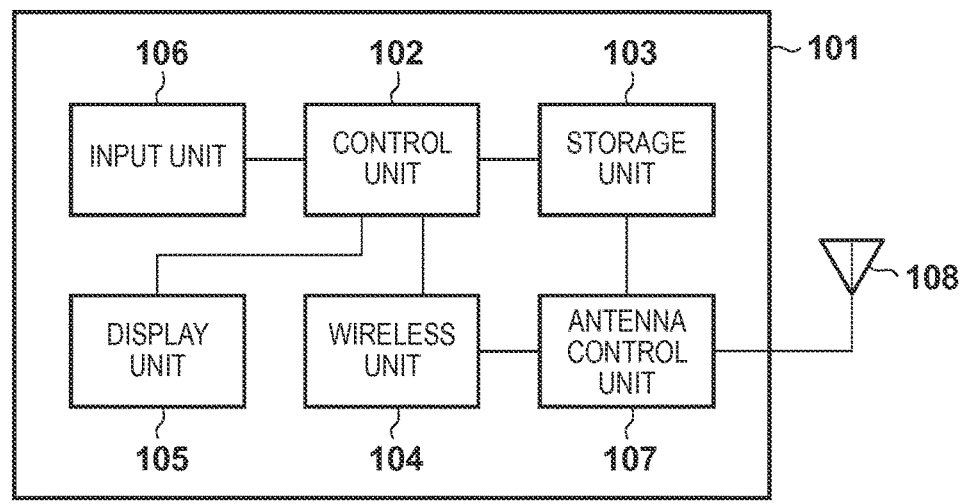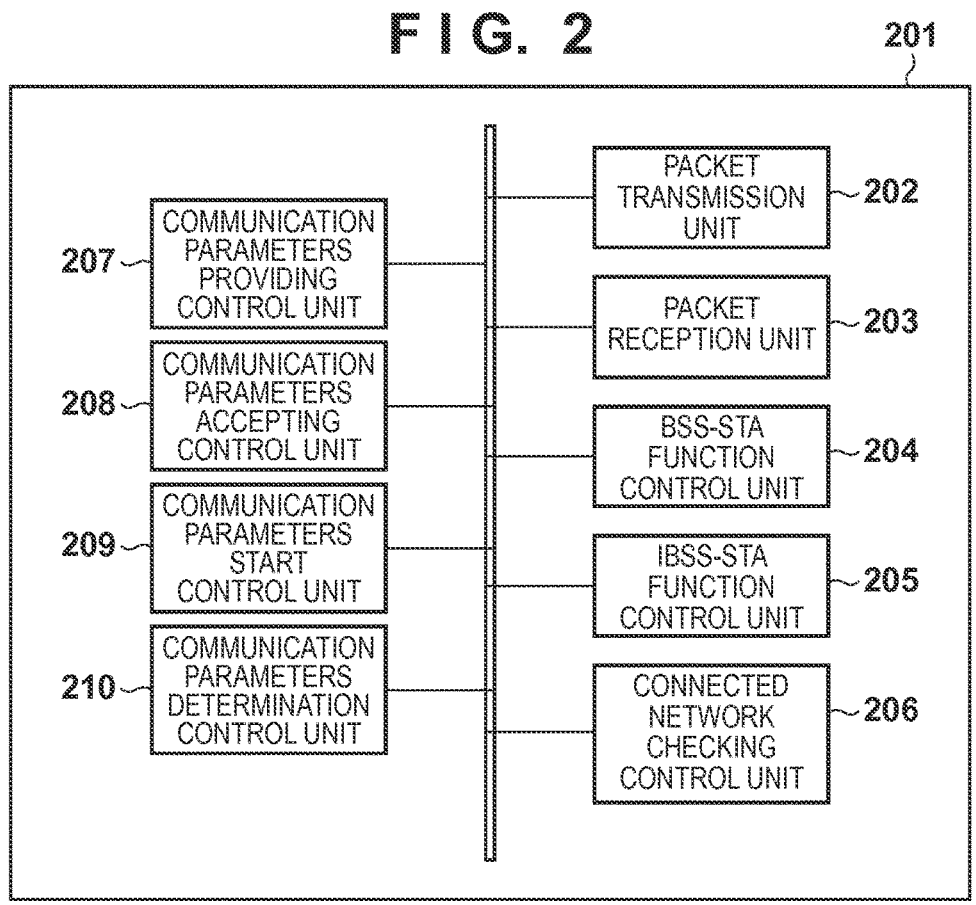

COMMUNICATION APPARATUS, CONTROL METHOD THEREOF, AND NON-TRANSITORY COMPUTER-READABLE STORAGE MEDIUM

BACKGROUND OF THE INVENTION

Field of the Invention

The present invention relates to a communication apparatus, a control method for the communication apparatus, and a non-transitory computer-readable storage medium.

Description of the Related Art

In wireless communication represented by a wireless LAN complying with the IEEE802.11 standard series, access points (base stations) and terminal apparatuses are defined and a connection procedure is standardized. This enables a terminal apparatus to perform Internet communication via an access point at home, an office, a public wireless LAN spot, or the like. Furthermore, there has been proposed a method of communicating with another terminal apparatus in an ad hoc mode while connecting to a base station in an infrastructure mode, by the support of a multi-BSS (Basic Service Set) function capable of creating a plurality of networks by one terminal apparatus (see Japanese Patent Laid-Open No. 11-055350).

A case in which communication parameters setting operation (setup operation) is performed in a multi-BSS capable terminal apparatus by a simple user operation such as pressing of a button will be described. The terminal apparatus is capable of connecting with a plurality of networks. It is assumed that a BSS to be used for communication is designated by a user selection operation. For example, the user needs to set up the terminal apparatus after selecting and specifying the infrastructure mode setting or ad hoc mode setting for the terminal apparatus. Especially, to set communication parameters while the terminal apparatus is connected with another communication apparatus, the user needs to correctly identify the status of a communication partner currently connected with the terminal apparatus or that of a communication partner to be newly connected, thereby impairing the usability. For example, if the infrastructure mode is erroneously selected to start communication setting for a communication apparatus currently connected in the infrastructure mode, the currently connected network is unwantedly disconnected.

SUMMARY OF THE INVENTION

The present invention improves the user convenience in a case where setting communication parameters in a communication apparatus capable of creating a plurality of networks.

According to a first aspect of the present invention, a communication apparatus, which is connectable with a plurality of networks including a first network and a second network of a type different from the first network, is provided. The communication apparatus comprises a detection unit configured to detect an operation by a user for setting communication parameters for connecting to a network, and a providing unit configured to provide, if the detection unit detects the operation while connecting with another first communication apparatus via the first network, another second communication apparatus with communication parameters for communication via the second network.

According to a second aspect of the present invention, a control method for a communication apparatus, which is connectable with a plurality of networks including a first network and a second network of a type different from the first network, is provided. The method comprises detecting an operation by a user setting communication parameters for connecting to a network, providing, if the operation is detected while connecting with another first communication apparatus via the first network, another second communication apparatus with communication parameters for communication via the second network.

Further features of the present invention will become apparent from the following description of exemplary embodiments (with reference to the attached drawings).

BRIEF DESCRIPTION OF THE DRAWINGS

FIG. 1 is a block diagram showing the arrangement of an apparatus according to an embodiment;

FIG. 2 is a block diagram showing the software arrangement of the apparatus according to the embodiment;

DESCRIPTION OF THE EMBODIMENTS

First Embodiment

Figure 3:
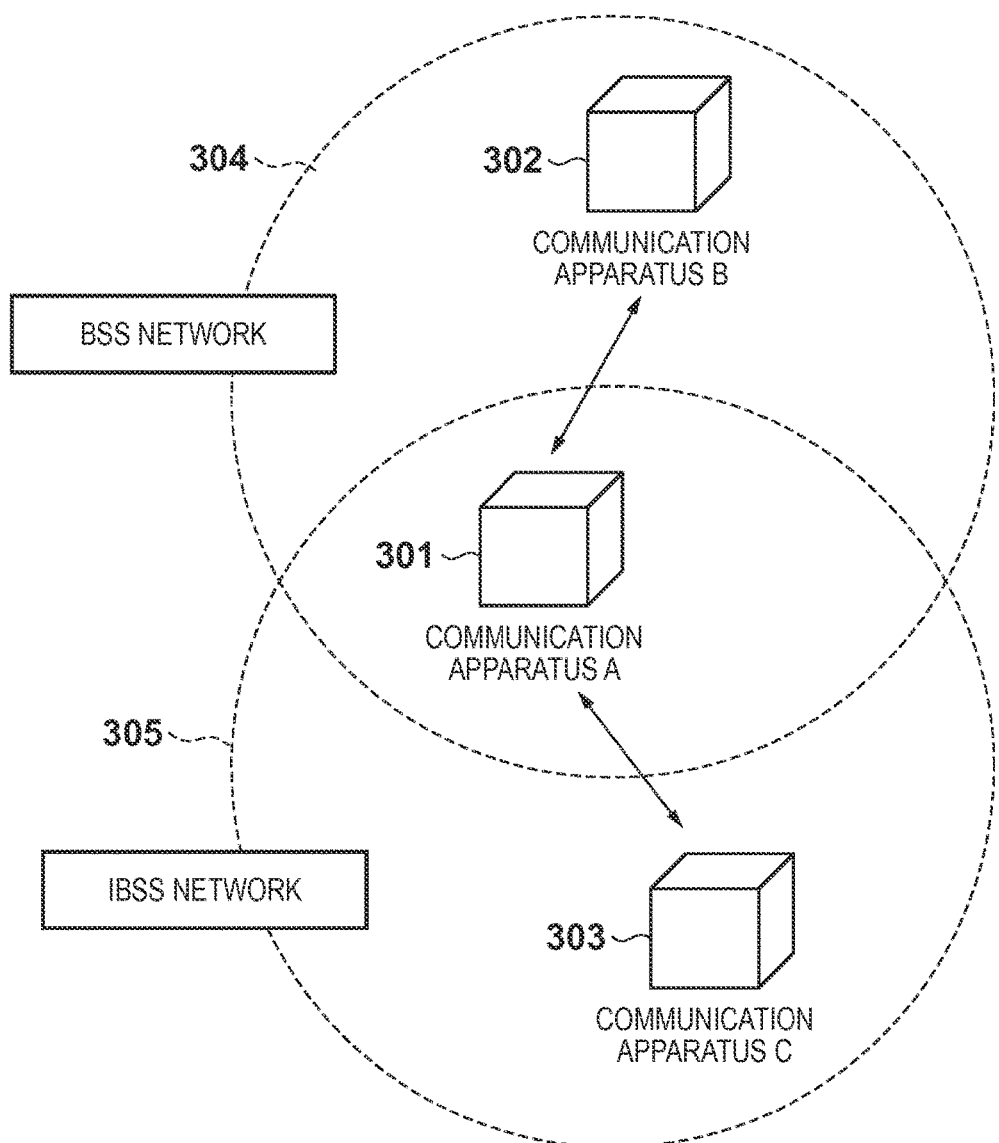
FIG. 3 is a view showing a network configuration according to the embodiment.

A communication apparatus according to the embodiment will be described in detail below with reference to the accompanying drawings. Although a case in which a wireless LAN system complying with the IEEE802.11 standard series is used will be explained below, a communication mode is not necessarily limited to a wireless LAN complying with the IEEE802.11 standard.

A hardware arrangement according to the embodiment will be described. FIG. 1 is a block diagram showing an example of the arrangement of a communication apparatus 101. In the communication apparatus 101, a control unit 102 controls the entire apparatus by executing control programs stored in a storage unit 103. The control unit 102 is, for example, a computer such as a CPU or MPU. The control unit 102 also controls a communication parameters automatic setting system with another apparatus. The storage unit 103 stores computer programs for control operations executed by the control unit 102, and various kinds of information such as communication parameters. Various operations (to be described later) are performed when the control unit 102 executes the control programs stored in the storage unit 103. Note that as the storage unit 103, a memory such as a ROM or RAM, a flexible disk, a hard disk, an optical disk, a magnetooptical disk, a CD-ROM, a CD-R, magnetic tape, a non-volatile memory card, a DVD, or the like is usable. A wireless unit 104 can perform wireless communication with a plurality of networks at the same time. A display unit 105 performs various display operations. The display unit 105 has a function to output visually perceivable information like an LCD or LED, and a function to output sound like a loudspeaker. An input unit 106 is used by the user to perform various input operations. The communication apparatus 101 also includes an antenna control unit 107 and an antenna 108.

FIG. 2 shows an example of the arrangement of software function blocks executed by the communication apparatus 101 which supports a multi-BSS function in processing (to be described later). Note that each function shown in FIG. 2 is implemented when the control unit 102 of the communication apparatus 101 cooperates with other components shown in FIG. 1.

Each function of an entire apparatus 201 will be described. A packet transmission unit 202 transmits packets associated with various communication processes. The packet transmission unit 202 transmits each signal (to be described later). A packet reception unit 203 receives packets associated with various communication processes. The packet reception unit 203 receives each signal (to be described later). A BSS-STA function control unit 204 controls acting as a terminal station (STA) in the infrastructure mode (BSS). The BSS-STA function control unit 204 performs processing by the infrastructure terminal station in a wireless LAN network such as transmission/reception of a search signal by the base station and processing of connecting with the base station. An IBSS-STA function control unit 205 controls acting as a terminal station (STA) in the ad hoc mode (IBSS). The IBSS-STA function control unit 205 performs processing (to be described later) by the ad hoc mode terminal station.

A connected network checking control unit 206 checks the type of network currently connected with the apparatus. The connected network checking control unit 206 executes connected network type checking processing (to be described later). A communication parameters providing control unit 207 provides communication parameters to a communication partner apparatus. A communication parameters accepting control unit 208 accepts communication parameters from a communication partner apparatus. A communication parameters start control unit 209 detects the start of communication parameters setting processing. For example, the communication parameters start control unit 209 performs a control operation associated with user button operation detection or menu selection operation detection in the input unit 106. A communication parameters determination control unit 210 determines whether to start the communication parameters providing control unit 207 or communication parameters accepting control unit 208 in communication parameters setting. The communication parameters determination control unit 210 also detects another communication apparatus which is executing a communication parameters operation.

FIG. 3 is a view showing a network including a communication apparatus A 301, a communication apparatus B 302, and a communication apparatus C 303. The communication apparatus A 301 has the arrangements shown in FIGS. 1 and 2 and described above. The communication apparatus A 301, therefore, acts as a terminal station which supports multi-BSS, and communicates with the communication apparatus B 302 (another first communication apparatus) via a BSS network 304 and the communication apparatus C 303 (another second communication apparatus) via an IBSS network 305. In this case, the communication apparatus B 302 may be replaced by an access point. The access point operates as a base station. Note that when the communication apparatus A 301 is connected with another communication apparatus, it stores, as device connection information, information about communication parameters such as the MAC address of the other connected communication apparatus, an encryption type, and an encryption key in the storage unit 103.

Figure 4:
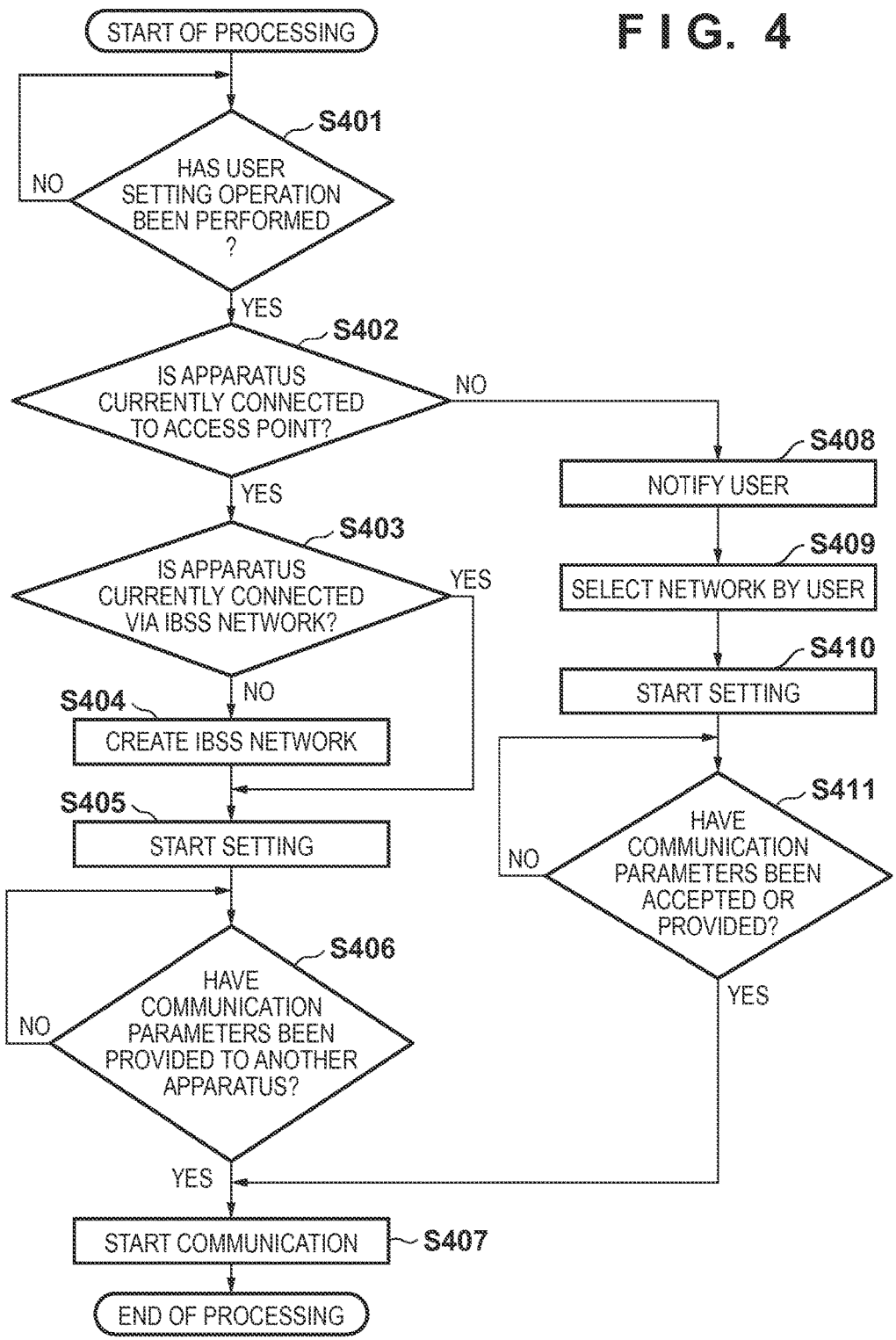
FIG. 4 is an operation flowchart illustrating communication parameters setting according to the first embodiment.

FIG. 4 is an operation flowchart illustrating communication parameters setting which is started when communication parameters setting processing for network connection is started in the communication apparatus A 301 according to the first embodiment. Processing indicated by the flowchart shown in FIG. 4 is performed when the control unit 102 reads out a computer program stored in the storage unit 103, and executes it.

After the start of the processing, the communication parameters start control unit 209 detects that the user has performed a parameters setting operation in the input unit 106 (step S401). If a setting operation by the user is detected, the connected network checking control unit 206 determines whether the apparatus is currently connected to an access point (assume in this case that communication apparatus B serves as an access point), that is, whether the apparatus is currently connected in the infrastructure mode (step S402). If the apparatus is currently connected to the access point as a result of the determination in step S402, the process advances to step S403. In step S403, the connected network checking control unit 206 determines whether the apparatus is also currently connected with another apparatus in the ad hoc mode, that is, whether the apparatus is currently connected via the IBSS network. If it is determined in step S403 that the apparatus is not currently connected in the ad hoc mode (the apparatus is in a non-connection state), the IBSS-STA function control unit 205 creates an IBSS network (ad hoc) (step S404). Based on the determination by the communication parameters determination control unit 210, the communication parameters providing control unit 207 starts setting processing as a communication parameters providing apparatus, and provides communication parameters to communication apparatus C as a setting target apparatus (step S405). The communication parameters providing control unit 207 determines whether the communication parameters have been provided to communication apparatus C (step S406). Upon completion of the communication parameters providing processing, communication apparatuses A and C start communication with each other in the ad hoc mode (step S407).

On the other hand, if it is determined in step S403 that the apparatus is currently connected with a communication apparatus other than communication apparatus C in the ad hoc mode, the process advances to step S405 without creating a new IBSS network. In step S405, to make a setting target apparatus (communication apparatus C in this example) join the already created IBSS network, the communication parameters providing control unit 207 provides the communication parameters of the currently connected IBSS network to the setting target apparatus.

Alternatively, if it is determined in step S402 that the apparatus is not currently connected to the access point (the apparatus is in a non-connection state), in step S408 the user is notified, through the display unit 105, of a list of usable networks and external apparatuses which have sent a network setting request. The list of usable networks includes a network which communication apparatus A can join, and a network which has been created or can be created by communication apparatus A. The user selects a network to be used for connection with the setting target apparatus in the input unit 106 (step S409). Note that in the network selection processing, setting in the infrastructure mode or setting in the ad hoc mode may be selected. In either case, the user only selects an arbitrary type of network at this time, and such a selection operation does not burden the user. Based on the determination by the communication parameters determination control unit 210, one of the communication parameters providing control unit 207 and the communication parameters accepting control unit 208 is activated to start setting processing as a communication parameters providing apparatus or communication parameters accepting apparatus (step S410).

The communication parameters providing control unit 207 or communication parameters accepting control unit 208 determines whether the communication parameters have been provided or accepted (step S411). If the communication parameters have been accepted, communication is performed based on the accepted communication parameters. On the other hand, if the communication parameters have been provided, communication is performed based on the provided communication parameters stored in the storage unit 103 (step S407). Note that although not specifically explained in this embodiment, the user may be notified through the display unit 105 that the apparatus is currently connected, upon completion of the communication parameters setting processing and start of communication. To notify the user of the multi-BSS function, the user may be notified, through the display unit 105, of a network connection state for each BSS (BSS or IBSS in this embodiment).

Figure 5:
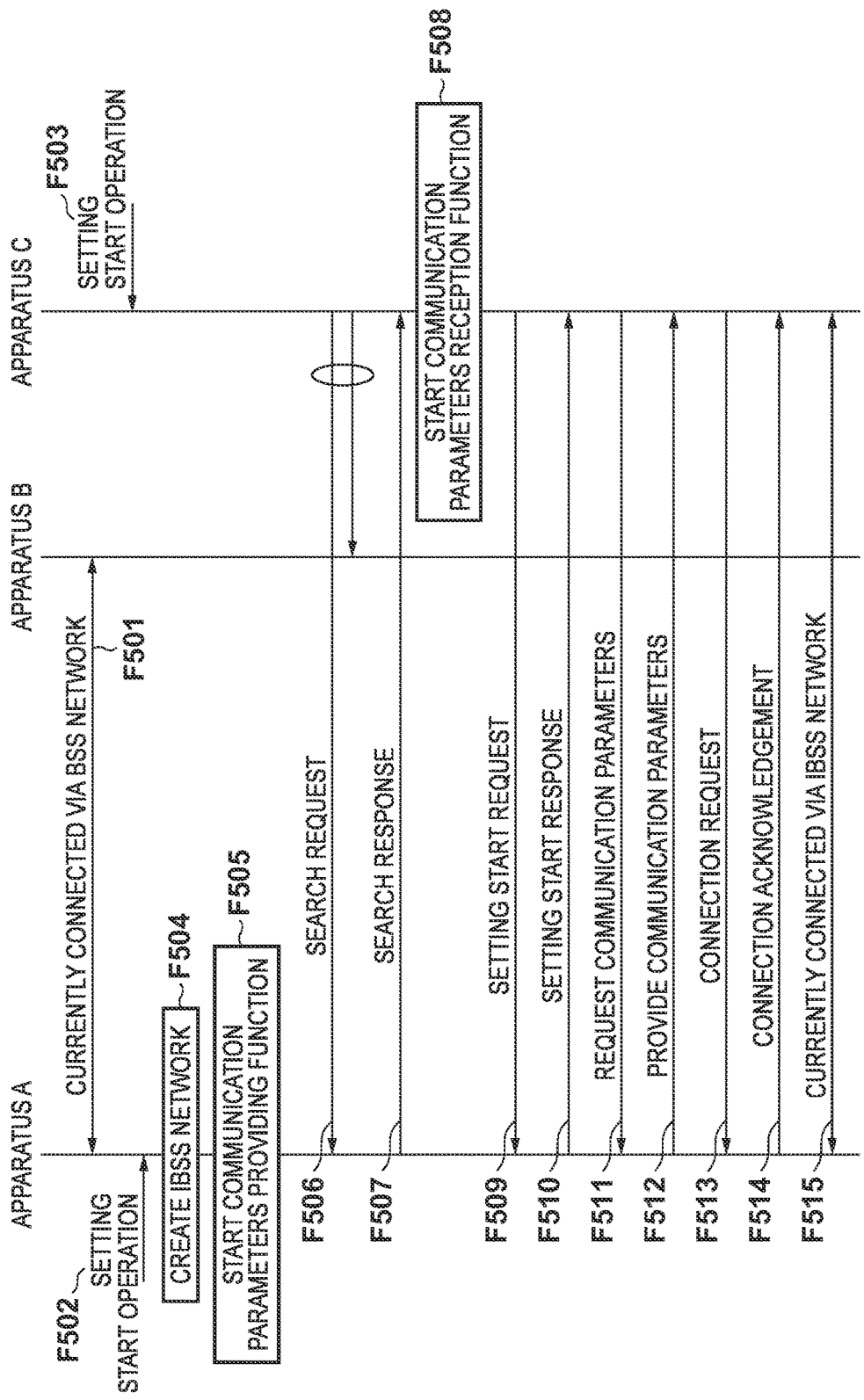
FIG. 5 is an operation sequence between communication apparatuses A to C according to the first embodiment.

FIG. 5 is a processing sequence until communication apparatus A is connected with new communication apparatus C when a user setting operation is performed in communication apparatus A while communication apparatus A is in connection with communication apparatus B acting as an access point in the BSS network. This processing sequence corresponds to steps S401 to S407 of FIG. 4.

Communication apparatus A is currently connected with communication apparatus B via the BSS network (F501). The user performs a communication parameters setting processing operation in communication apparatus A (step S401, F502). Furthermore, the user performs a communication parameters setting processing operation in communication apparatus C (F503). Communication apparatus A is currently connected with the BSS network but is not currently connected with an IBSS network (YES in step S402 and NO in step S403). Communication apparatus A creates an IBSS network (step S404, F504), starts a communication parameters providing function (step S405), and stands by for connection with a new communication apparatus (F505). After the setting operation, communication apparatus C transmits a search request (for example, a Probe Request signal) including an information element indicating a communication parameters processing request, and searches for a peripheral apparatus which has started communication parameters setting processing (F506). Communication apparatus A returns a search response (for example, a Probe Response signal) including an information element that indicates that communication parameters providing processing is in progress (F507).

Upon receiving the search response from communication apparatus A, and determining that the communication parameters providing processing is in progress, communication apparatus C starts a communication parameters reception function (F508). Communication apparatus C transmits a setting start request to request start of communication parameters setting (F509), and communication apparatus A returns a communication parameters setting start response (F510). After that, communication apparatus C requests to provide communication parameters (F511), and communication apparatus A provides the communication parameters in response to the request (step S406, F512). Communication apparatus C selects an SSID and security scheme based on the accepted communication parameters and sets a security key, and then transmits a connection request to communication apparatus A, thereby requesting to start security communication (F513). Communication apparatus A sends a security communication response, thereby transmitting a connection acknowledgement to communication apparatus C (F514). At this time, communication apparatuses A and C enter an IBSS network connection state (F515), and communication apparatus A can simultaneously communicate with communication apparatuses B and C via different networks (step S407). Note that although not specifically shown, the user can discriminate between success and failure of the result of the setting operation by displaying the network connection status of each BSS network on the display unit 105 in communication apparatus A having the multi-BSS function.

A time-out time may be set for determination in step S407 or S411. That is, upon start of network setting in step S405 or S410, a timer is started. If a time-out of the timer occurs before communication parameters setting is completed, processing may be terminated.

As described above, if a communication parameters setting operation is performed in an apparatus which supports a multi-BSS function while the apparatus is connected via one BSS network, it is possible to automatically set another BSS network with a new apparatus, and connect with it. That is, it is possible to connect with an apparatus without requesting the user to perform a complicated selection operation. Furthermore, by performing a setting operation while the apparatus is connected with an access point, an ad hoc network is immediately created, thereby enabling to prevent erroneous setting with another access point.

In the first embodiment, if a communication parameters setting operation for network connection is detected when the apparatus is currently connected with a network in the infrastructure mode (currently connected with an access point), connection in the ad hoc mode is started. In the connection in the ad hoc mode, if there is no network currently connected in the ad hoc mode, the apparatus tries to connect with a partner terminal apparatus using a newly created network. If there is a network currently connected in the ad hoc mode, the apparatus tries to connect with a partner terminal apparatus using the connected network. The apparatus, therefore, tries network connection while maintaining existing network connection (network connection with the access point or network connection in the ad hoc mode). As described above, in the embodiment, if there is unused one among a plurality of networks in a setting operation, network connection is performed using it. If all networks are in use, one of them which has no influence on the currently connected networks is used. The user, therefore, can instruct network connection setting without considering the currently connected networks, thereby improving the convenience.

Second Embodiment

In the first embodiment, processing executed, after determining whether an apparatus is currently connected with an access point (BBS network), when a communication parameters setting operation is performed in the apparatus which supports a multi-BSS function has been described. To the contrary, the following processing in this embodiment will be described. That is, when a communication parameters setting operation is performed in a communication apparatus which supports a multi-BSS function, it is determined whether there is a currently connected network. If there is a currently connected network, a control operation corresponding to the type of network currently connected is performed; otherwise, the apparatus is connected to a network without any selection operation by the user. Note that unlike the first embodiment, even if there is no currently connected BSS network, a selection operation by the user is not necessary in this embodiment. In this embodiment, a communication apparatus has the arrangements shown in FIGS. 1 and 2 and described in the first embodiment. Similarly to FIG. 3, a network includes a communication apparatus A 301, a communication apparatus B 302, and a communication apparatus C 303.

Figure 6:
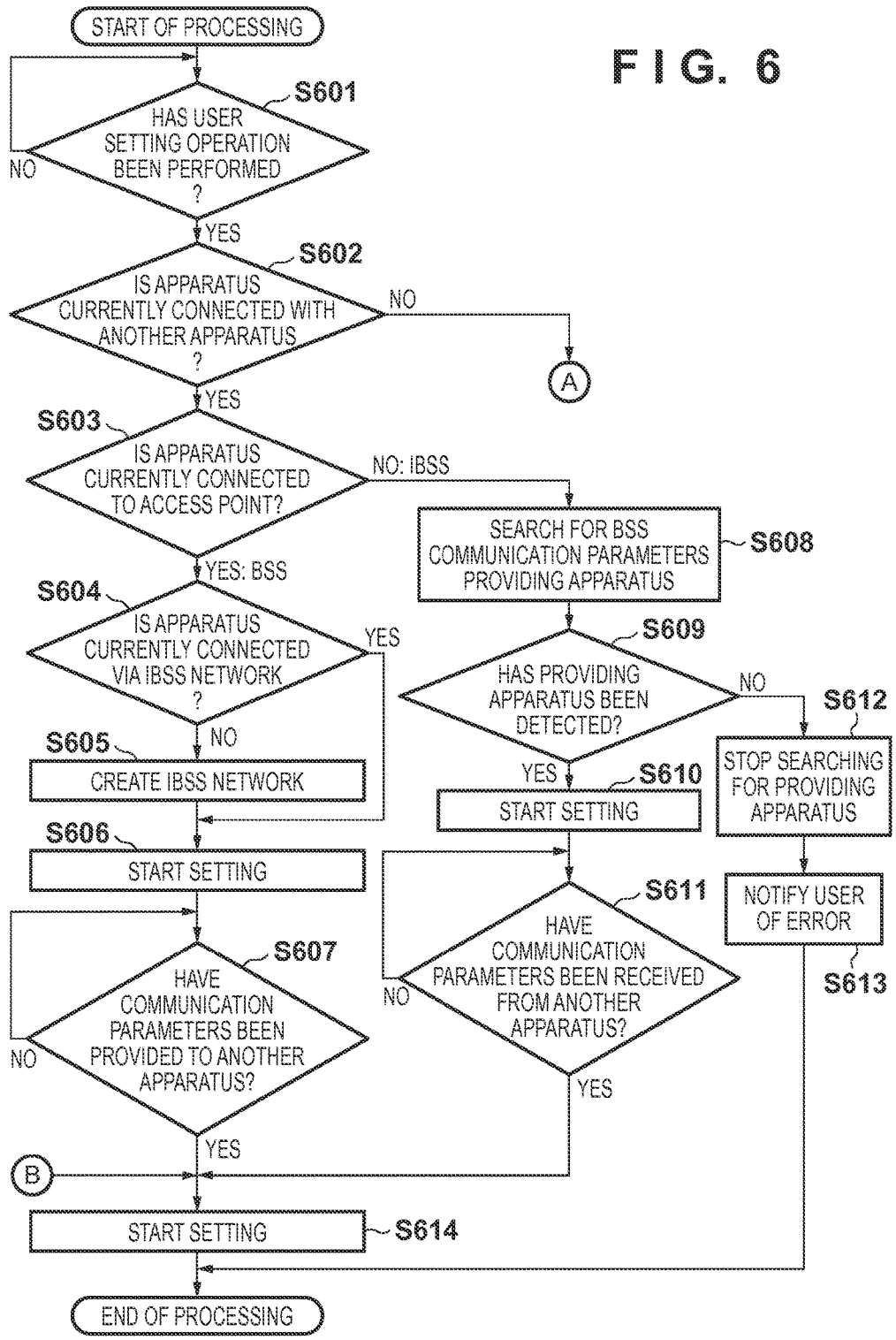
FIG. 6 is an operation flowchart illustrating communication parameters setting according to the second embodiment.

FIG. 6 is an operation flowchart illustrating communication parameters setting started when setting processing is started in communication apparatus A according to the second embodiment. Processing indicated by the flowchart shown in FIG. 6 is performed when a control unit 102 reads out a computer program stored in a storage unit 103, and executes it.

After the start of the processing, a communication parameters start control unit 209 detects that the user has performed a setting operation in an input unit 106 (step S601). If a setting operation by the user is detected, a connected network checking control unit 206 determines whether the apparatus is currently connected with another communication apparatus (communication apparatus B or C in this example) (step S602). If the apparatus is not currently connected with another communication apparatus (the apparatus is in a non-connection state) (NO in step S602), the process advances to step S701 of FIG. 7. Processing in step S701 and subsequent steps will be described in detail with reference to FIG. 7. On the other hand, if the apparatus is currently connected with another communication apparatus (communication apparatus B in this example) (YES in step S602), the connected network checking control unit 206 determines whether the currently connected network type is the infrastructure mode, that is, whether another communication apparatus serves as an access point (step S603). If another communication apparatus serves as an access point, the unit 206 further determines whether the apparatus is currently connected with still another communication apparatus in the ad hoc mode (IBSS) (step S604). If it is determined that the apparatus is currently connected with still another communication apparatus in the ad hoc mode (YES in step S604), the process advances to step S606 without creating a new IBSS network. In step S606, to make a setting target apparatus (communication terminal C in this example) join the created network in the ad hoc mode, a communication parameters providing control unit 207 provides the communication parameters of the currently connected network to communication apparatus C as a setting target apparatus.

On the other hand, if the apparatus is not currently connected in the ad hoc mode (NO in step S604), an IBSS-STA function control unit 205 creates an IBSS network (ad hoc) (step S605). Based on determination by a communication parameters determination control unit 210, a communication parameters providing control unit 207 starts setting processing as a communication parameters providing apparatus, and provides communication parameters to communication apparatus C as a setting target apparatus (step S606). The communication parameters providing control unit 207 determines whether the communication parameters have been provided to communication apparatus C (step S607). Upon completion of providing of the communication parameters, communication apparatuses A and C start communication with each other in the ad hoc mode (IBSS) (step S614).

If the currently connected network types are limited to the ad hoc mode (IBSS) (NO in step S603), a BSS-STA function control unit 204 of communication apparatus A starts processing of searching for a BSS network to join it (step S608). The communication parameters determination control unit 210 of communication apparatus A determines whether a communication apparatus which has started a BSS network communication parameters providing function, that is, a communication apparatus serving as an access point has been detected (step S609). If the communication parameters determination control unit 210 of communication apparatus A detects communication apparatus B which has started a communication parameters providing function, the communication parameters providing control unit 207 of communication apparatus A starts communication parameters setting (step S610). If a communication parameters accepting control unit 208 of communication apparatus A receives communication parameters from communication apparatus (step S611), the apparatus starts connection/security communication using the received communication parameters (step S614). On the other hand, if the communication parameters determination control unit 210 of communication apparatus A can detect no communication apparatus which has started a communication parameters providing function (NO in step S609), the apparatus stops searching for a providing apparatus (step S612). The apparatus then notifies the user of an error through the display unit 105 such as an LED, display, or buzzer (step S613).

Figure 7:
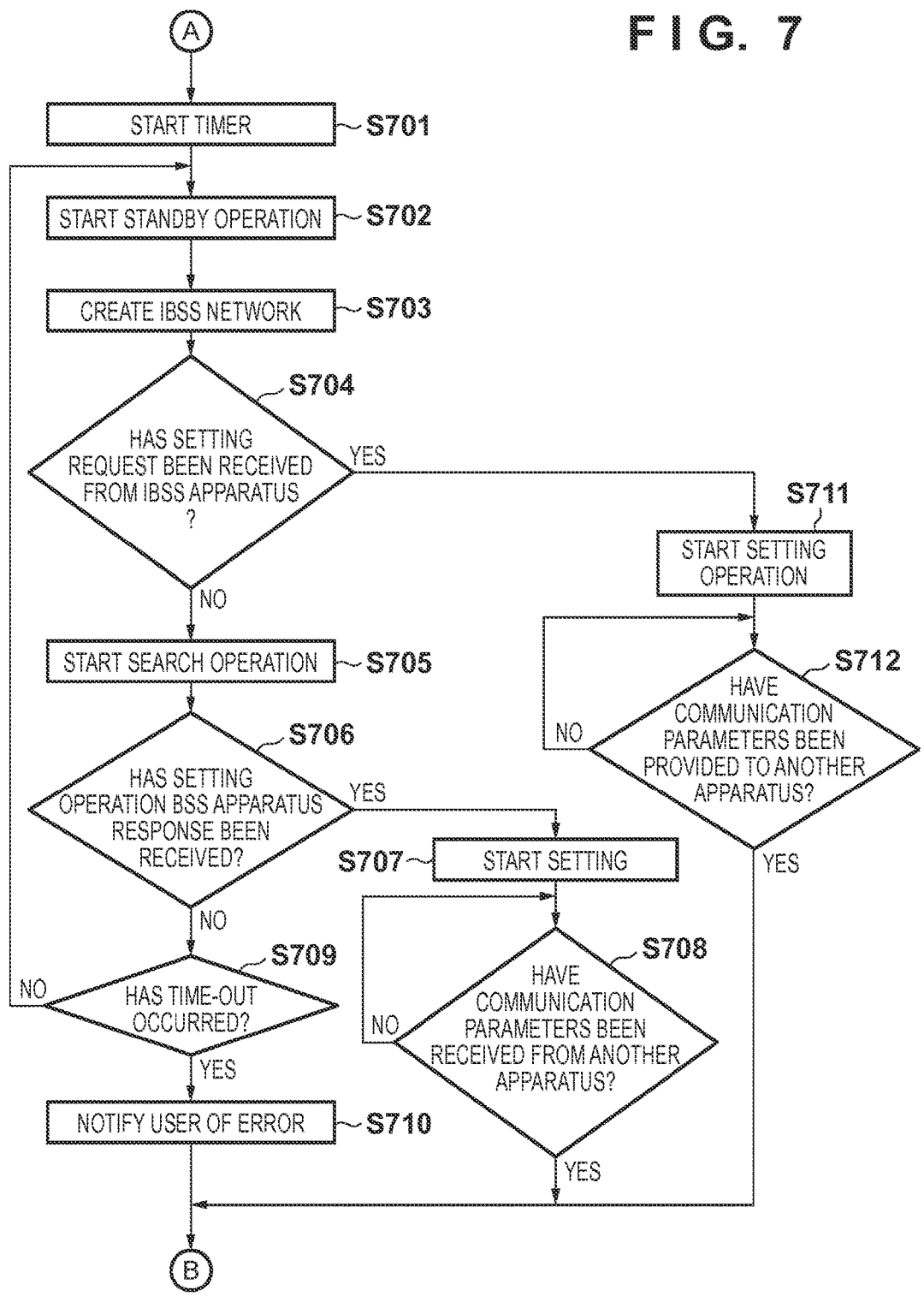
FIG. 7 is an operation flowchart illustrating communication parameters setting according to the second embodiment.

FIG. 7 is an operation flowchart illustrating communication parameters setting which is started in response to a setting processing start operation by the user in communication apparatus A according to the second embodiment when it is not currently connected with another communication apparatus. This flowchart forms part of the operation flowchart shown in FIG. 6 described above. Processing indicated by the flowchart shown in FIG. 7 is performed when the control unit 102 reads out a computer program stored in a storage unit 103, and executes it. As an example in which the apparatus is not currently connected with another communication apparatus, a setting operation is performed for the first time. Furthermore, a case in which the setting information of another communication apparatus is changed after completion of setting, a case in which setting with another communication apparatus is complete but communication apparatus A or the other communication apparatus moves outside a wireless communication range with each other, or the like is considered.

The communication parameters determination control unit 210 of communication apparatus A starts a timer (not shown) for checking a set time has expired (step S701). The communication parameters determination control unit 210 then starts a standby operation of standing by for a communication parameters setting request signal from another communication apparatus (step S702), and the IBSS-STA function control unit 205 creates an IBSS network (ad hoc) (step S703). With this processing, communication apparatus A instructs the other communication apparatus to perform an operation using the communication parameters of the IBSS network of the self communication apparatus. That is, communication apparatus A can prompt the other communication apparatus to join the IBSS network of the self apparatus. After that, the communication parameters accepting control unit 208 determines whether a communication parameters setting request has been received from communication apparatus C which desires to create an IBSS network (step S704). If the request has been received (YES in step S704), the communication parameters determination control unit 210 starts a setting operation to operate the communication parameters providing function (step S711). Note that although not particularly shown, it is possible to return a setting response signal in response to the communication parameters setting request of the other apparatus after operating the providing function. The communication parameters providing control unit 207 starts communication parameters setting with communication apparatus C, and determines whether the communication parameters have been provided (step S712). Upon completion of providing of the communication parameters, the process advances to step S614 (FIG. 6), and communication with the other communication apparatus (communication apparatus C in this example) to which the apparatus has provided the communication parameters starts (step S614).

If the communication parameters accepting control unit 208 has not received a communication parameters setting request from communication apparatus C (NO in step S704), the communication parameters determination control unit 210 switches the standby operation to a search operation. That is, the apparatus transmits a search signal representing a setting request to another communication apparatus which has started the setting operation (step S705). The standby operation in step S702 and the search operation in step S705 are done while being switched at a predetermined interval until a time-out occurs (step S709). If a time-out occurs in step S709, the user is notified of an error (step S710). If the apparatus receives a setting response signal from communication apparatus B which has started a setting operation in the BSS network (YES in step S706), the BSS-STA function control unit 204 performs connection with communication apparatus B, enables the communication parameters accepting control unit 208, and starts a communication parameters accepting function (step S707). The apparatus starts communication parameters setting with communication apparatus B, and determines whether communication parameters have been accepted (step S708). Upon completion of accepting of the communication parameters, the process advances to step S614 (FIG. 6), thereby starting communication with the providing source (communication apparatus B in this example) of the communication parameters (step S614).

Figure 8:
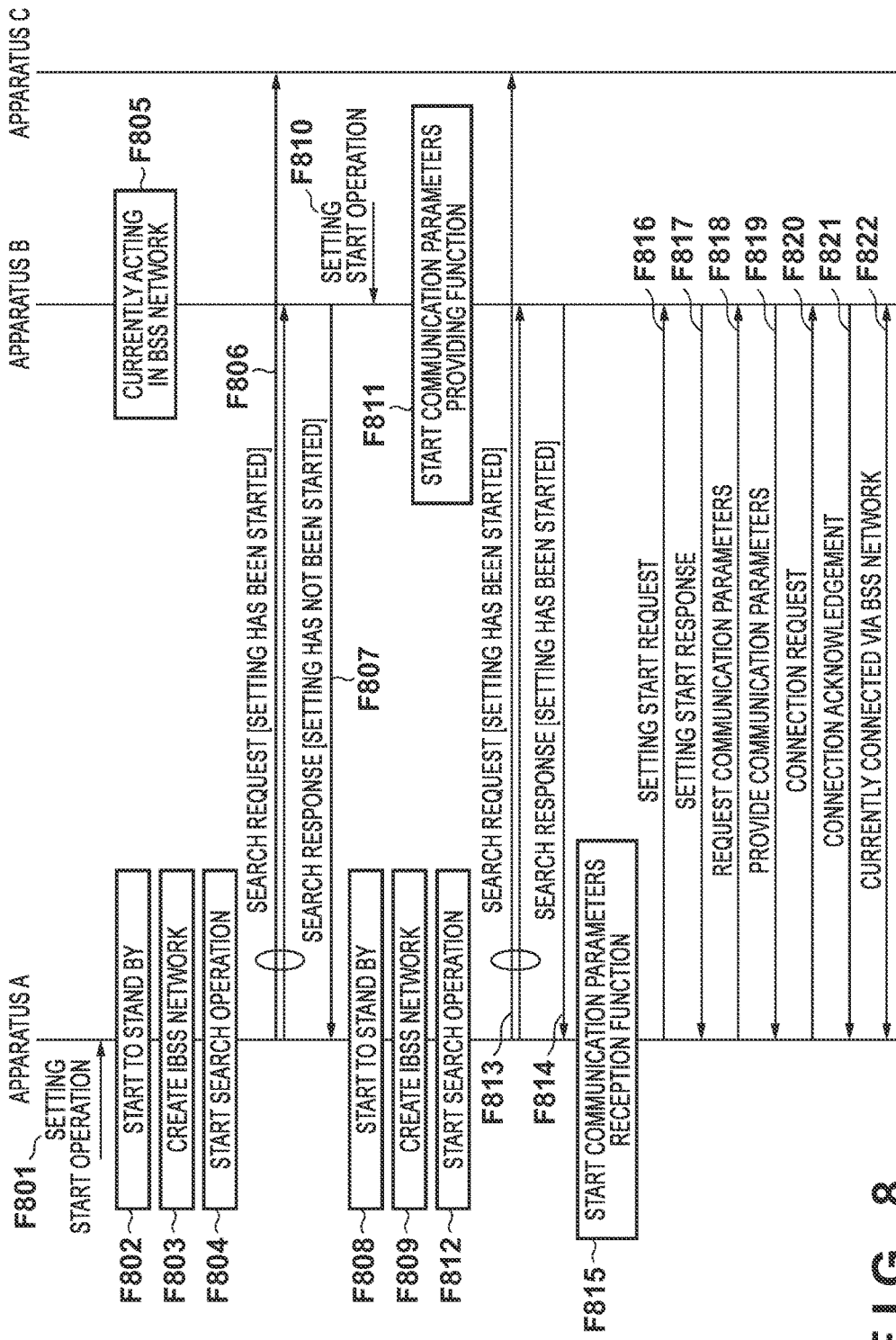
FIG. 8 is an operation sequence between communication apparatuses A to C according to the second embodiment.

FIG. 8 is a processing sequence until communication apparatus A is connected with communication apparatus B when communication apparatus A is not currently connected with another communication apparatus and communication parameters setting is started in response to a setting processing start operation. This processing sequence corresponds to steps S601 and S602 of FIG. 6, steps S701 to S708 of FIG. 7, and step S614 of FIG. 6.

In communication apparatus A, the user performs a communication parameters setting processing operation (F801). Communication apparatus A starts to stand by (step S702, F802), and creates an IBSS network (F803). Whether another communication apparatus as a setting target is in a BSS network or IBSS network has not been determined at this time. On the other hand, communication apparatus B acts in the BSS network (F805). Communication A starts a search operation to switch from the standby operation to the search operation (F804). At this time, communication apparatus A transmits a search request signal including information indicating that setting has been started (F806). Since communication apparatus B has not started setting at this time, it returns a search response signal including information indicating that setting has not been started (F807). After that, communication apparatus A starts a standby operation after a predetermined period (F808), creates an IBSS network (step S703, F809), and determines whether a communication parameters setting request has been received from a communication terminal connected to the IBSS network. Assume that no communication parameters setting request has been received (NO in step S704). Communication apparatus B then performs a setting start operation (F810). Communication apparatus B immediately starts a communication parameters providing function (F811). Communication apparatus A starts a search operation to switch from the standby operation to the search operation again (F812). Communication apparatus A transmits a search request signal including information indicating that setting has been started (step S705, F813). Since communication apparatus B has started setting, it returns a search response signal including information indicating that setting has been started (F814).

Upon receiving the response signal, communication apparatus A starts a communication parameters reception function (step S706, F815). Communication apparatus A then transmits, to communication apparatus B, a setting start request to request start of communication parameters setting (step S707, F816), and communication apparatus B returns a communication parameters setting start response (F817). Communication apparatus A requests to provide communication parameters (F818), and communication apparatus B provides the communication parameters in response to the request (step S708, F819). Communication apparatus A selects an SSID and security scheme based on the accepted communication parameters and sets a security key, and then transmits a connection request to communication apparatus B, thereby requesting to start security communication (F820). Communication apparatus B transmits a connection acknowledgement as a security communication response to communication apparatus A (F821). At this time, communication apparatuses A and B enter a BSS network connection state (step S614, F822).

As described above, even if a setting operation occurs in a communication apparatus which supports a multi-BSS function while the apparatus is not connected to any BSS network, it is possible to automatically set an IBSS network (ad hoc mode) or a BSS network (infrastructure mode) with a new communication apparatus, and connect with it. That is, it is possible to connect to a network by only executing a connectable network type while switching between a standby operation and a search operation without requesting the user to perform a complicated selection operation.

If the apparatus is currently connected via the IBSS network, it is possible to prevent erroneous connection with another ad hoc network by immediately searching for a BSS network providing apparatus.

As described above, if a setting start operation is performed while a multi-BSS capable communication apparatus is connected with an access point, a connectable ad hoc network is immediately created, and then the apparatus acts as a communication parameters providing apparatus. This enables an operation from setting to connection in a desired and usable network by only a simple operation such as pressing of a button without considering the BSS network type of a communication partner. That is, according to the present invention, in a communication apparatus capable of simultaneously creating a plurality of networks, user convenience in communication parameters setting improves.

Although the embodiments of the present invention have been described, they are merely examples for description of the present invention, and do not limit the scope of the present invention. Various modifications can be made to the embodiments without departing from the spirit of the present invention. Furthermore, a wireless LAN complying with the IEEE802.11 standard has been explained above as an example. The present invention, however, may be implemented in another wireless medium such as wireless USB, MBOA, Bluetooth®, UWB, or ZigBee. Note that MBOA is an abbreviation for Multi Band OFDM Alliance. UWB includes wireless USB, wireless 1394, and WINET.

Note that although the combination of a BBS network (infrastructure mode) and an IBSS network (ad hoc mode) has been exemplified in the above embodiments as a plurality of BSS networks which can be simultaneously created, the present invention is not limited to this. For example, a first network in which a self apparatus serves as a terminal in the infrastructure mode to connect to an external access point, and a second network in which the self apparatus serves as an access point may be created. In this case, for example, it is only necessary to replace the BSS network in the first embodiment by the first network, and the IBSS network by the second network. The first network can indicate a network in which communication apparatus A of the embodiments always acts as a communication parameters accepting side apparatus in communication parameters setting. The second network can indicate a network in which communication apparatus A can act as a communication parameters providing side apparatus in communication parameters setting.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-113757, filed on May 17, 2012 which is hereby incorporated by reference herein in its entirety.

What is claimed is:

1. A communication apparatus capable of connecting concurrently to a first wireless network and a second wireless network having a different type from the first wireless network, comprising:
a memory storing a program; and
a processor, operating under control of the program stored in the memory, to:
communicate, with a communication partner apparatus, regarding communication parameters to be used for connecting via the second wireless network, wherein
(1) in a case where the communication apparatus connects via the second wireless network while not connected to the first wireless network, the communication apparatus determines whether to execute either a process to provide the communication parameters from the communication apparatus to the communication partner apparatus or a process to receive the communication parameters from the communication partner apparatus, and executes one of the process to provide the communication parameters to the communication partner apparatus and the process to receive the communication parameters according to a determination result, and
(2) in a case where the communication apparatus connects via the second wireless network while connected to the first wireless network, execute the process to provide the communication parameters to the communication partner apparatus without performing the determination,
wherein the processor is configured to operate, in a case where the communication apparatus connects via the second wireless network while connected to the first network, to not receive the communication parameters from the communication partner apparatus.

2. The communication apparatus according to claim 1, wherein the first wireless network is a network to be connected by communication parameters provided from another communication apparatus.

3. The communication apparatus according to claim 1, wherein the first wireless network is a network in an infrastructure mode of a wireless LAN complying with the IEEE802.11 series, and the second wireless network is a network in an ad hoc mode of a wireless LAN complying with the IEEE802.11 series.

4. The communication apparatus according to claim 1, wherein the first wireless network is a network which is created an access point in an infrastructure mode of a wireless LAN complying with the IEEE802.11 series.

5. The communication apparatus according to claim 1, wherein the second wireless network is a network which the communication apparatus as an access point in an infrastructure mode of a wireless LAN complying with the IEEE802.11 series.

6. A control method for a communication apparatus capable of connecting concurrently to a first wireless network and a second wireless network having a different type from the first wireless network, the method, comprising:
communicating, with a communication partner apparatus, regarding communication parameters to be used for connecting via the second wireless network, wherein
(1) in a case where the communication apparatus connects via the second wireless network while not connected to the first wireless network, the communicating comprises determining whether to execute either a process to provide the communication parameters from the communication apparatus to the communication partner apparatus or a process to receive the communication parameters from the communication partner apparatus, and executing one of the process to provide the communication parameters to the communication partner apparatus and the process to receive the communication parameters according to a determination result, and
(2) in a case where the communication apparatus connects via the second wireless network while connected to the first wireless network, the communicating comprises executing the process to provide the communication parameters to the communication partner apparatus without performing the determination,
wherein, in a case where the communication apparatus connects via the second wireless network while connected to the first network, the communication parameters are not received from the communication partner apparatus, and wherein at least one of the steps is performed by a processor cooperating with a memory.

7. A non-transitory computer-readable storage medium storing a program which, when executed by a computer, executes steps of a control method for a communication apparatus capable of connecting concurrently to a first wireless network and a second wireless network having a different type from the first wireless network, the method comprising:

communicating, with a communication partner apparatus, regarding communication parameters to be used for connecting via the second wireless network, wherein (1) in a case where the communication apparatus connects via the second wireless network while not connected to the first wireless network, the communicating comprises determining whether to execute either a process to provide the communication parameters from the communication apparatus to the communication partner apparatus or a process to receive the communication parameters from the communication partner apparatus, and executing one of the process to provide the communication parameters to the communication partner apparatus and the process to receive the communication parameters according to a determination result, and (2) in a case where the communication apparatus connects via the second wireless network while connected to the first wireless network, the communicating comprises executing the process to provide the communication parameters to the communication partner apparatus without performing the determination, wherein, in a case where the communication apparatus connects via the second wireless network while connected to the first network, the communication parameters are not received from the communication partner apparatus.

8. The communication apparatus according to claim 1, wherein the processor also operates under control of the program to newly form the second wireless network in a case where the communication apparatus is not connected to the second wireless network, and wherein the providing provides communication parameters for using to connect to the second wireless network which is formed by the forming.

9. The communication apparatus according to claim 1, wherein the first wireless network is a network which would be formed by the communication apparatus connecting to an access point in an infrastructure mode of a wireless LAN complying with the IEEE802.11 series, and the second wireless network is a network which would be formed by the communication apparatus directly connecting to the communication partner apparatus by a wireless LAN complying with the IEEE802.11 series, not via the access point.

* * * * *